US006834674B2

United States Patent
Koschany et al.

(10) Patent No.: US 6,834,674 B2
(45) Date of Patent: Dec. 28, 2004

(54) PRESSURE VESSEL WITH AN INTEGRATED CONTROL UNIT FOR THE CONTROL OF COMPRESSED FLUID

(76) Inventors: Arthur E Koschany, Pfarrweg 5, 94121 Salzweg (DE); Jan Göbelsmann, Hauptstrasse 29, 02794 Spitzkunnersdorf (DE)

( * ) Notice: Subject to any disclaimer, the term of this patent is extended or adjusted under 35 U.S.C. 154(b) by 0 days.

(21) Appl. No.: 10/465,979

(22) PCT Filed: Dec. 20, 2001

(86) PCT No.: PCT/DE01/04817

§ 371 (c)(1),
(2), (4) Date: Aug. 18, 2003

(87) PCT Pub. No.: WO02/053966

PCT Pub. Date: Jul. 11, 2002

(65) Prior Publication Data

US 2004/0065371 A1 Apr. 8, 2004

(30) Foreign Application Priority Data

Dec. 29, 2000 (DE) .......................................... 100 65 268

(51) Int. Cl.[7] ............................................. F17C 13/04
(52) U.S. Cl. ................................... 137/613; 137/505.25
(58) Field of Search ............................. 137/613, 505.25

(56) References Cited

U.S. PATENT DOCUMENTS

| 5,341,844 | A | 8/1994 | Wass et al. |
| 5,452,738 | A | 9/1995 | Borland et al. |
| 6,041,762 | A | 3/2000 | Sirosh et al. |
| 6,142,128 | A | 11/2000 | Gobbi |
| 6,186,168 | B1 | 2/2001 | Schultz et al. |
| 6,675,831 | B2 * | 1/2004 | Sakaguchi et al. .......... 137/613 |

FOREIGN PATENT DOCUMENTS

EP     0753700 B1   1/1995

* cited by examiner

*Primary Examiner*—Kevin Lee
(74) *Attorney, Agent, or Firm*—Peter E. Rosden

(57) ABSTRACT

A pressure vessel for storing a compressed gas comprises a closed pressure vessel housing which consists of an essentially cylindrical main part and of closing caps located on both sides. The pressure vessel also comprises an integrated control device for delivering the gas including a pressure reducer with a high-pressure part and a low-pressure part and including a controlled gas outlet. At least one of the closing caps is a part that is assembled with the cylindrical main part and the majority of the components of the control device are mounted on this part and are directed inside the vessels housing.

22 Claims, 2 Drawing Sheets

PRESSURE VESSEL WITH AN INTEGRATED CONTROL UNIT FOR THE CONTROL OF COMPRESSED FLUID

TECHNICAL FIELD

The invention relates to a pressure vessel for the storage of a compressed fluid, for example a compressed gas.

BACKGROUND OF THE INVENTION

It often is desirable to integrate means for the control of the compressed fluid into a pressure vessel. For example, the safety of such a gas vessel can be increased considerably by fitting a solenoid operated shut-off valve into the vessel. The U.S. Pat. No. 5,562,117 describes such a shut-off valve that can be screwed into a CNG (Compressed Natural Gas) pressure-vessel used for CNG-vehicles. By means of such a valve, the supply of natural gas can be allowed or barred according to the needs of the engine. In addition, it is designed to remain fail-safe closed even if, in case of an impact, the part of the valve protruding from the neck of the pressure-vessel is shorn of, thereby possibly preventing a hazardous exit of gas.

It can also be of advantage to mount a unit for the control of the pressure of a compressed gas directly at the pressure vessel. Thus, the U.S. Pat. No. 6,041,762 describes a control module which is likewise mounted onto the CNG-vessel of a CNG vehicle. This module comprises a pressure-reducing valve which extends from the module into the pressure vessel, and serves for reducing the gas storing pressure down to the system-pressure required by the combustion engine. Due to this set-up, with the pressure-reducing means located at the gas tank, the high-pressure piping with its enormous weight, that connects the gas tank to the engine of the vehicle and increases the risk of leakage, can be omitted. In addition, an externally mounted part of the module is equipped with a solenoid-actuated shut-off valve for the cut-off of the gas flow as well as a check-valve to enable the filling of the tank, these units constituting further control means.

For vehicles powered by fuel that is stored in high-pressure vessels it is of advantage if the complete high-pressure part of the supply system to the engine is integrated into the vessel. It is thereby possible to easily remove the pressure vessel for external re-filling, as described in DE 195 39 329 A.

Generally, means for the control of compressed fluids—wherein the control can also be a part of a closed-loop control—such as pressure regulation, power regulation etc.—comprise all of the following: shut-off valves for the cut-off of the supply of the fluid to the consumer, pressure-reducing valves for controlling the pressure of the fluid, through-flow control valves that cut-off the supply of the fluid in case of excessive flow-out, e.g. in case of a leak in the piping, fusible-cut outs which are to enable a non-dangerous, controlled exit of the fluid in case of the external temperature exceeding a specific value, residual-pressure control valves preventing a complete purging of the vessel, as well as check valves to enable the filling of the pressure vessel.

It is state of the art to restrain compressed fluids like gases pressurized in vessels made of steal, or anyhow in vessels which completely consist of metal. There are also composite pressure vessels, as, for example, described in EP 0 753 700. These pressure vessels consist of a liner made of plastic or a light metal like aluminum and a layer reinforcing the liner and being realized by a winding of a fibre composite material. The reinforcement is realized by winding a fibre-composite around the liner, typical fibre materials being, for example, carbon fibres, aramid fibres, glas fibres, boron fibres or aluminum-oxide fibres or mixtures thereof, embedded in a duromer like epoxy resin or phenol resin, or in a thermoplastic like polypropylene etc. Compared to steel vessels, a considerable reduction in weight is possible.

It is known that for the manufacturing of such composite pressure vessels, neck portions are used that encapsulate the pressure vessel in the direction of the longitudinal axis and which are equipped with threads that are used for fitting valves onto the pressure vessel. These neck portions usually have a sleeve which connects to the liner on one side and which is wrapped around by the windings of the fibre reinforcement on the other side so that a leak-tight connection is effected, as described e.g. in DE 197 51 411. Such pressure vessels are usually used for vessel pressures up to 300 bar (4350 psi).

SUMMARY OF THE INVENTION

The invention is to integrate the units required for the control of a compressed fluid like a diaphragm controlled pressure-reducing valve, a shut-off valve, a through-flow controlling valve, a fusible cut-out, a residual-pressure valve or a fill valve or different combinations thereof into a pressure vessel. This allows for a high level of safety against mechanical damage as no parts of the valves extrude from the pressure vessel except those required for biasing the pressure-reducing diaphragm. Preferably the combined unit of control means and vessel should be constructed to be of low weight.

According to the invention, this problem is solved by a pressure vessel for the storage of a compressed gas with a closed vessel housing consisting of an essentially cylindrical body with pole-caps on both ends and with integrated control means for the release of the gas, including a pressure-reducing means heaving a high-pressure unit and a low-pressure unit and a controlled gas outlet, which pressure vessel is characterized in that at least one of the pole-caps is an element mounted to the cylindrical body and the majority of the components of the control means are mounted to this element and extend into the interior of the vessel housing; the components necessary for the control thus lie within the pressure vessel wall.

Preferred embodiments of the invention are to be found in the respective sub-claims.

The control means included in the pressure vessel in this way are, as already mentioned above, shut-off valves, pressure-reducing valves, preferably diaphragm controlled, through-flow control valves, fusible cut-outs, residual-pressure valves or fill-valves or of any optional combination of these.

An integrated shut-off valve can be operated either manually, or by solenoid or pneumatically. Should one of the latter two methods of operation be adopted, a manual override is incorporated to allow for opening or closing the valve even in case of interruption of the solenoid or pneumatical actuation.

Diaphragm-controlled pressure-reducing valves can work either spring- or dome-loaded. In the first case, the bias load required on the pressure-reduce diaphragm is achieved by a compressed spring placed in a spring housing and executing a force onto the membrane. Via a set screw that varies the spring tension, the bias tension and thus the outlet pressure of the pressure reducing valve required are set. In the second case, biasing is effected by a compressed pneumatic auxiliary fluid which is contained in a housing, the dome, above the diaphragm. By varying the pressure of the auxiliary fluid, the bias tension and thus the outlet pressure can be adjusted.

A residual-pressure valve is a check valve that is placed at the entry of the control components in the vessel. It closes if the storage pressure in the vessel drops under a specified value. This prevents the complete purging of the vessel. The residual-pressure valve can be equipped with a fine filter element to protect the control components.

According to the invention, the control means are surrounded by the wall of the vessel, and the wall of the vessel or a part thereof is shaped so that its material fulfills the function of specific control components such as, for example, the function of component housing walls, or that specific parts of the control means extruding from the vessel wall make up an inseparable unit with the vessel wall material.

With metallic vessels, this is realized by fitting a metal cap with the required bores and welding it to housing parts into which the respective components of the control means are to be built. They are designed in such a way that, upon finishing the production of the vessel, no components of the control means protrude from the outside face of the vessel with the exception of those components required to bias the pressure reducing diaphragm, i.e. the spring housing or dome, according to the version used. Subsequently, the cap is welded onto the cylindrical part of the vessel. Preferably, however, the pressure vessel according to the invention is manufactured by the manufacturing method for composite pressure vessels. Here, the aforementioned neck portions are replaced by pole-caps into which the components of the control means are built.

Further details, advantages and improvements of the invention will become apparent from the following description of preferred embodiments of the invention, referring to the drawings in which:

DETAILED DESCRIPTION OF THE INVENTION

Figure 1:
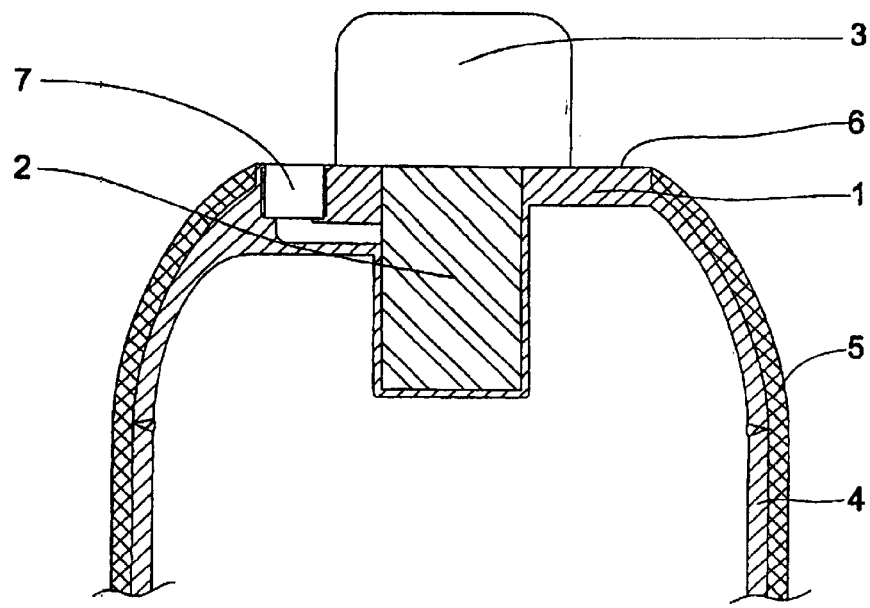
FIG. 1: is a schematic sectional view through an axial end of a pressure vessel according to the invention.

FIG. 1 shows one end of a composite pressure vessel which is made of a cylindrical body and two ball-calotte-like pole-caps which are generally formed by respective pole-caps 1. The pole-caps 1 are designed in such a way that, from the face which after finishing the vessel is exposed to the outside, no components of the control means protrude, except components 3 which are needed to produce the bias tension of the diaphragm of the pressure-reducer. If an aluminum liner or a liner made of a different suitable metal is used, the pole-cap 1 is made of the corresponding material and is finally welded to the cylindrical part 4 of the liner. When a plastic liner is used, the unit consisting of the control means and the pole-cap is equipped with an other thread and is screwed into a zone of the opening of the plastic liner, which zone is equipped with an interior thread. It is possible to integrate the control means into one or into both pole-caps of the pressure vessel. This combination of pole-caps and liner is then equipped with a fibre reinforcement 5 according to known procedures. For this, the liner and the pole-cap 1 are wrapped with the fibre reinforcement 5, up to an area 6 which slightly protrudes from the pole-cap and axially ends it. On this area 6, the dome or the spring housing 3 of the pressure reducer are mounted, and there the taps and the manual emergency operating means of the shut-off valve are placed (schematically shown in FIG. 1 by a fluid outlet 7). This design is mainly suitable when pressure reducers with rather small diaphragm areas are incorporated, as the diameter of the end surface 6 does not exceed 10 cm.

If it is necessary to use pressure reducers with larger diaphragms, the diameter of the pole-cap increases accordingly, which makes it impossible to apply a fibre reinforcing winding on a large area. Therefore the material walls have to be thicker to enable the pole-caps to withhold the storage. Alternatively, a design can be used which keeps the high-pressure part 8 of the control components within the vessel up to the valve seat 9 of the pressure-reducing valve or up to the through flow limiting wave 10, surrounded by an inner layer 11 of the fibre reinforcing winding (see FIG. 2). Thus, only a relatively small opening in the supporting fibre reinforcement is required as the large pressure-reducing diaphragm 12 lies outside of this reinforcing winding. The diaphragm is part of a low-pressure component 13 which includes the gas outlet 7 and the dome or the spring housing 3 of the pressure-reducing valve, the component 13 being mounted onto the fibre reinforcement layer 11. The vessel and low-pressure component 13 will finally be equipped with a reinforcing winding 14 once more. This winding 14 can be executed less thick and thus less solid than the first layer 11 as its task is only to fix the low-pressure component and to protect it against mechanical damage.

Even if a pressure reducer with a larger-area diaphragm is used, the variant described first, with only one fibre reinforcement winding, can still be used if the pole-cap is designed sufficiently solid so as to withstand the storage pressure. However, this results in a higher total weight of the pressure vessel.

Elements for the fixation of the pressure vessel can be integrated into the fibre-reinforcement winding so that the finished vessel can be mounted according to the application it was made for.

Besides building—in the control means into one or both of the pole-caps of the pressure vessel, there is the possibility of fitting a suitably shaped unit having control means integrated, into the cylindrical part of the pressure vessel.

Compared to the pressure reducer shown in the U.S. Pat. No. 6,041,762 mentioned above, according to the invention, attention need not be paid to the fact that the pressure reducer fits into the opening of the neck of a pressure vessel. Instead, the pole-cap can be designed according to the needs of the pressure reducer. Thereby, it is possible to use a diaphragm controlled pressure reducer with a large area diaphragm that allows to keep the outlet-pressure constant very precisely. In order to receive a fairly constant outlet pressure under conditions of heavily changing inlet pressure, which is a situation typical when pressure vessels are emptied, a diaphragm area as large as possible is demanded which enables high operation forces even at a low outlet pressure, so that the fluctuations of the pre-pressure forces are not so important. Such a pressure reducer makes a second pressure control stage superfluous, and the fluid heaving a constant output pressure down to pressure-levels of some mbar can directly be put into use for an application. When a balanced poppet design is used in combination with a large-area diaphragm, the fluctuations of the storage pressure are passed on to the output side at a ratio of 3/10,000 only.

Furthermore, no elements for the fixation of the control components are required besides the pressure vessel itself. For example a diaphragm-controlled pressure reducer mounted externally of the vessel requires a housing which, due to the solid walls is heavy and bulky. Therefore, if the material of the pressure vessel itself takes over the function of the housing for the control components, there is less volume and weight. Nevertheless, as described above, it is possible to use pressure reducers with large area diaphragms which would normally require an even larger housing of the pressure reducer or could not be positioned in a pressure vessels neck.

Another saving in weight is achieved by the fact that the high-pressure components of the pressure-reducing valve need only have a minor wall thickness since they lie within the pressure vessel and thus, the pressure is balanced inside and outside of these components.

The neck zone of the pressure vessel that usually houses a thread for fitting valves or a pressure reducer also becomes superfluous. Since this thread has to be made strong enough to withstand the high storage pressure, this neck zone usually is of enormous weight. On the contrary, the pressure vessel according to the invention is lighter since there, only a low-pressure line is connected to the outlet of the integrated pressure reducer, demanding screwed connections that are less stable only.

A special advantage of the pressure vessel of the invention is the high grade of safety against mechanical damage, resulting from the fact that the control means and the pressure vessel are one compact unit. This is mainly the case if the pressure vessel is used as an exchange system. The components of the control means are positioned within the pole-cap and, together with the pole-cap, are encapsulated by the fibre reinforcement winding and thus are well guarded against external effects. There are no parts of the control means that extend beyond the pressure vessel surface and could thus be liable to be shorn off by mechanical stress. An exception are those parts of the pressure reducer which are required to bias the diaphragm. This is, in a dome-controlled pressure reducer, the dome in which, by an auxiliary fluid, a pressure is generated by which the bias tension of the membrane can be adjusted. In case of a spring-loaded pressure reducer, it is the spring housing holding the spring by which the membrane is biased. If these components are shorn off, the consequence is that the bias does no longer act on the diaphragm and the pressure reducer closes. Therefore, in case of mechanical damage, the safety against an undesired gas outlet is increased. The dome or, respectively, the spring housing can be designed with nominal breaking-points so as to break at definite points in case of excess stress, thereby to protect the other control components, such as e.g. the pressure reducer diaphragm, from damage.

If the pressure vessel according to the invention is used as a gas storage for a CNG-vehicle, only the dome or the spring housing and the low-pressure piping screwed into the vessel can be shorn off in case of a crash. In addition to the then fail-safe closed pressure-reducing valve, by the disconnection of the driving, an electromagnetic or a pneumatic shut-off valve would also be cut off. As long as the pressure vessel itself is not damaged a loss of gas is prevented. Should a high-pressure line connected to the vessel for filling it be cut in two, this does not lead to a loss of gas either since the filling-valve of the vessel constructed as a check-valve.

Also in handling and during the transport of the pressure vessel according to the invention, the control means integrated into the vessel are protected from mechanical damage.

It is another safety feature that a through-flow limiting valve 10 which is placed into the outlet passage of the pressure reducer is encapsulated by the pressure vessel. It closes the further supply in case of an exceeding take-out. Excessive take-out can occur if the connection line to the user is shorn off, if the pressure reducer poppet gets damaged or seriously blocked or if the diaphragm of a spring-loaded pressure reducer breaks. In dome-controlled pressure reducers, the pressure reducing valve to close automatically. The through-flow limiting valve 10 comprises a movable poppet that is placed in the outlet flow-passage and kept open by a spring. The differential pressure across the poppet rises if a certain flow speed is exceeded, the spring force is compensated and the poppet closes. The poppet can be designed to allow for a permissible leakage or to close leak-tight. In the first case, it is sufficient to stop the flow and thus to allow the poppet to open again. In the second case, a pressure balance has to be brought about externally to re-open the valve.

Also, by the pressure vessel according to the invention, the screw connection which, in the prior art, is between the common pressure vessel and an outlet valve or a pressure-reducing valve is superfluous, leading to an increased safety of the vessel.

These safety features are not provided for in the control module of the U.S. Pat. No. 6,041,762. Although in that prior art the pressure-reducing valve is positioned inside the vessel, other components like the fill valve are placed in a part outside of the module. Consequently, in case of tearing off of this external part, a direct connection to the inside of the pressure vessel could be caused, leading to an uncontrolled flow-out of gas. Also, as stated, such a design does not allow for the use of a large area pressure reducer diaphragm, reducing the accuracy of the pressure control.

The pressure vessel according to the invention can not be used for storing natural gas for CNG-vehicles only but also e.g. for storing compressed hydrogen for the operation of fuel-cells and for the operation of fuel-cell operated vehicles, for storing breathing air for respirator apparatus or diving apparatus or also for storing propane or butane gas. It can be used in all applications where a pressure vessel with a high safety level against mechanical damage and with low weight is demanded.

Further details and embodiments of the pressure vessel according to the invention, here used as a hydrogen source, are described in the following by way of examples:

EXAMPLE 1

Figure 2:
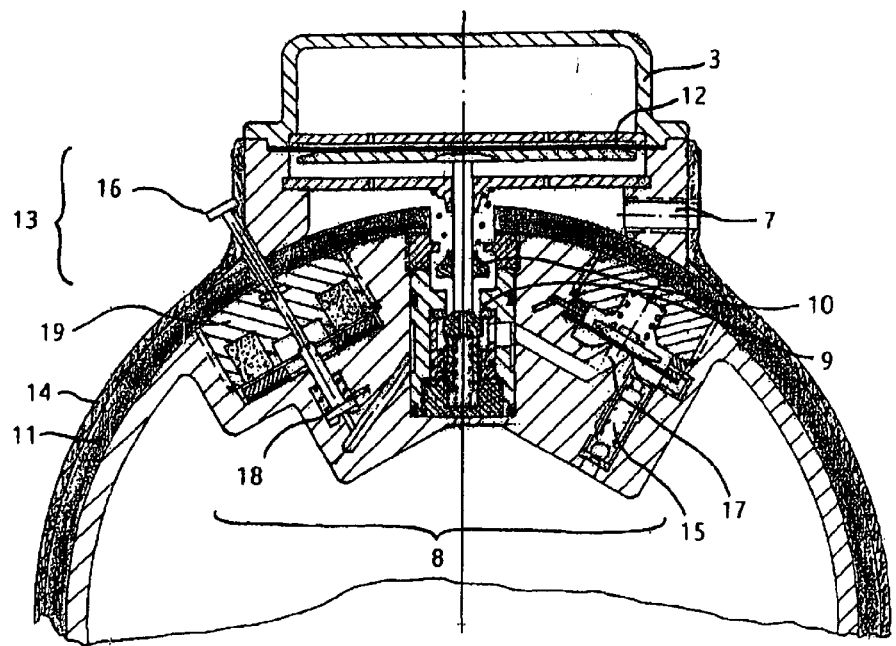
FIG. 2: is a sectional view through the axial end of a pressure vessel of another embodiment, showing a diaphragm having a large area and a pole cap split into a high-pressure part and a low-pressure part.
Figure 3:
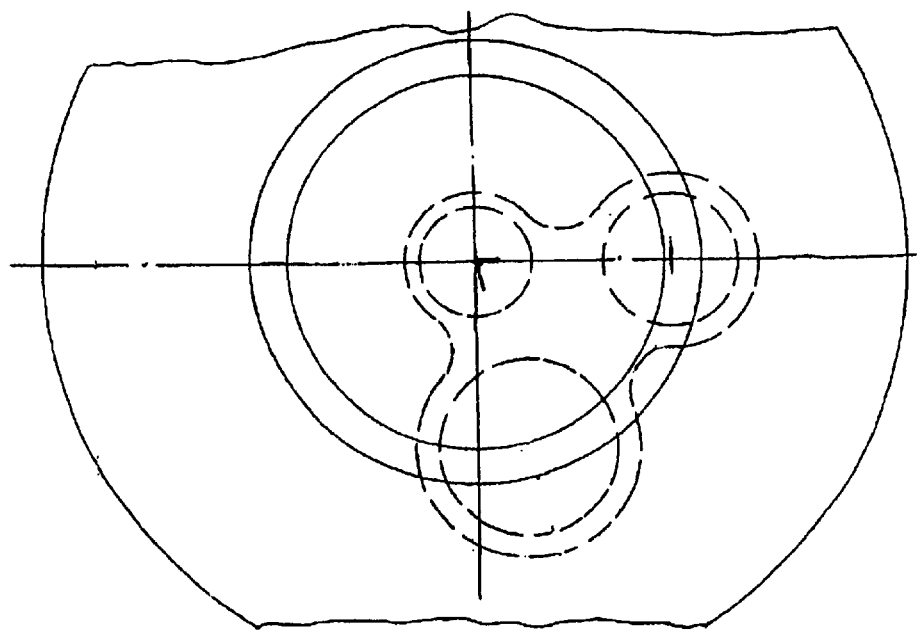
FIG. 3: is a top view onto the pressure vessel of FIG. 2.

If, for the control of pressure as exact as possible, a large area of the diaphragm is required, the high-pressure components 8, i.e. the residual pressure valve 15, the pre-operated solenoid valve 17, 18 and the valve seat 9 and the poppet as well as the through-flow limiting valve 10 are integrated into the interior of the liner of the composite pressure vessel (see FIGS. 2 and 3). This high-pressure part 8 is equipped with the fibre reinforcement winding layer 11 which withholds the storage pressure. On this layer, the low-pressure part 13 is mounted which mainly serves for fixing the diaphragm 12 of the pressure-reducing valve. It also contains the gas outlet 7 and a lead-through for the manual emergency actuation 16 of the shut-off valve. The dome 3 or, respectively, the spring housing 3' are mounted onto it. The pressure vessel including the low-pressure part 13 is then wrapped with a second, thinner fibre reinforcement 14 up to the dome 3 or the spring-housing 3', which reinforcement firmly fixes the low-pressure part 13 with the first fibre reinforcement 11, protecting it from mechanical damage. The pre-controlled shut-off valve consists of a main valve 17, which is forcedly actuated, and a pre-control valve 18 operated by a solenoid 19. A filling valve as well as a fusable shut-out are integrated into the pole-cap opposite of the pressure reducer, likewise wrapped by both reinforcing windings.

Figure 4:
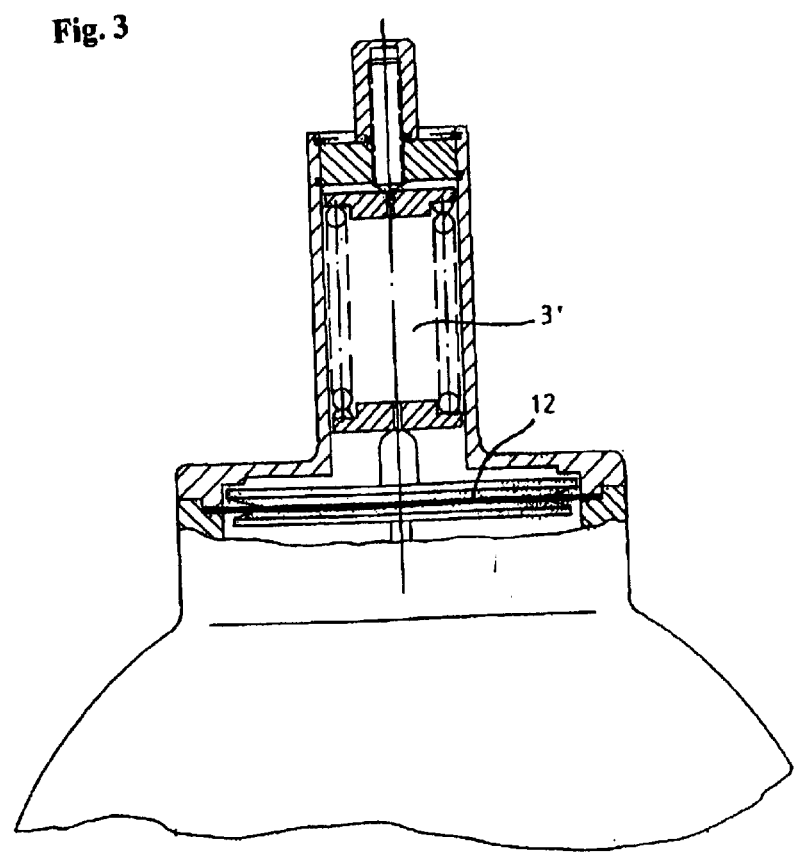
FIG. 4: is an elevation of a pressure vessel according to an other, modified embodiment with a spring-loaded pressure reducing valve instead of a dome controlled one.

FIG. 4 shows an elevation of the pressure vessel where instead of the dome 3 a spring housing 3' constructed according to usual standards is used for generating the bias pressure for the diaphragm of the pressure reducer.

EXAMPLE 2

A simple design of the invention may only comprise a solenoid operated shut-off valve with manual emergency operation and a filling valve, which are situated in a pole-cap.

LIST OF REFERENCE NUMBERS (1) Pole-cap
(2) Integrated control components
(3) Components for generating the tension biasing of the pressure reducer diaphragm (dome or spring housing)
(4) Cylindrical part of a metallic liner
(5) Fibre reinforcement winding
(6) End-surface of the pole-cap
(7) Gas outlet
(8) High-pressure part of the pole-cap of the pressure vessel
(9) Valve seat of the pressure-reducing valve
(10) Through-flow limiting valve
(11) Inner fibre reinforcement winding
(12) Diaphragm of the pressure-reducing valve
(13) Low-pressure part of the pole-cap of the pressure vessel
(14) Outer fibre reinforcement winding
(15) Residual-pressure valve
(16) Manual emergency actuation of the shut-off valve
(17) Forcibly actuated main valve of the pre-controlled shut-off valve
(18) Pre-controlled valve
(19) Solenoid for operating the pre-controlled valve

What is claimed is:

1. A pressure vessel for storage of a compressed gas, comprising a closed pressure vessel housing having an essentially cylindrical main part and end-caps on both ends, and an integrated control means (2) for the release of the gas, including a shut-off valve (17) and a pressure reducer with a high-pressure part (8) and a low-pressure part (13) wherein at least one of the end-caps (1) is an element mounted together with the cylindrical main part and at least the high-pressure part (18) of the pressure-reducer and the shut-off valve (17) are mounted to one of the end-caps and are directed into the interior of the vessel housing.

2. Pressure vessel according to claim 1, wherein all components of the high-pressure unit (8) of the pressure reducer are mounted to the end-cap element (1) and project into the interior of the vessel housing.

3. Pressure vessel according to claim 2, wherein the lateral expansion of the components projecting into the interior of the vessel altogether does not exceed the lateral extension of the end-cap to which they are connected.

4. Pressure vessel according to claim 3, manufactured as a composite pressure vessel with a liner (4), wherein at least one end-cap (1) is a pole-cap which holds the components required for the control of compressed gas and is wrapped, together with the liner, by a fibre reinforcement layer (5).

5. Pressure vessel according to claim 4, wherein at least one pole-cap (1) of the pressure vessel is designed in such a way that there are, after adding the fibre reinforcement layer (5), no components of the control means (2) which extend beyond the vessel surface besides some elements (3, 3') generating a bias tension for the pressure reducer.

6. Pressure vessel according to claim 3, that is made as a metallic pressure vessel and wherein at least one end-cap (1) of the pressure vessel encloses the components of the control means (2) and is welded to the cylindrical main part (4) of the vessel.

7. Pressure vessel according to claim 6, wherein at least one end-cap (1) of the metal pressure vessel is shaped in such a way that there are no components of the control means (2) which project beyond the vessel surface, with the exception of some elements (3, 3') which generate a bias tension for the pressure reducer.

8. Pressure vessel according to claim 7, wherein the control means (2) includes a pressure reducer, a shut-off valve (17), a through-flow valve, a fusable cut-out, and either a residual-pressure valve (15) or a check-valve for filling the pressure vessel, or any combination thereof.

9. Pressure vessel according to claim 5, wherein the at least one pole-cap (1) of the pressure vessel is split into an inner high-pressure part (8) which is surrounded by a fibre reinforcement layer (11), and a low-pressure part (13) mounted on said first layer and surrounded by a second fibre reinforcement layer (14).

10. Pressure vessel according to claim 9, wherein the high-pressure part (8) comprises a residual-pressure valve (15), a shut-off valve (17), the components of a pressure reducer up to the valve seat (9) and a through-flow limiting valve, and wherein further the low-pressure part (13) comprises a pressure reducer diaphragm (12) and the gas outlet (7).

11. Pressure vessel according to claim 10, having two pole-caps opposite each other, wherein a filing-valve and a fusable cut-out are integrated into the pole-cap of the pressure vessel opposite the pole-cap (1) with the pressure reducer.

12. Pressure vessel according to claim 11, wherein the pressure reducer is controlled either by variations in pressure of a compressed pneumatic auxiliary fluid contained in the housing or by force exerted by a spring.

13. Pressure vessel according to any of claim 12, further including a shut-off valve (17) which is operated manually, pneumatically or by a solenoid.

14. Pressure vessel according to claim 13, wherein in the case of operating the shut-off valve (17) pneumatically or by solenoid, an additional device (16) for its manual actuation is provided.

15. Pressure vessel according to claim 4, wherein the control means (2) includes a pressure reducer, a shut-off valve (17), a through-flow control valve, a fusable cut-out, and either a residual-pressure valve (15) or a check-valve for filling the pressure vessel, or any combination thereof.

16. Pressure vessel according to claim 6, wherein the pressure reducer is controlled either by variations in pressure of a compressed pneumatic auxiliary fluid contained in the housing or by force exerted by a spring.

17. Pressure vessel according to claim 6, further including a shut-off valve (17) which is operated manually, pneumatically or by a solenoid.

18. Pressure valve according to claim 17, wherein in the case of operating the shut-off valve (17) pneumatically or by solenoid, an additional device (16) for its manual actuation is provided.

19. Pressure vessel according to claim 1, wherein the lateral expansion of the components projecting into the interior of the vessel altogether does not exceed the lateral extension of the end-cap to which they are connected.

20. Pressure vessel according to claim 1, manufactured as a composite pressure vessel with a liner (4), wherein at least one end-cap (1) is a pole-cap which holds the components (2) required for the control of compressed gas (2) and is wrapped, together with the liner, by a fibre reinforcement layer (5) and, further, wherein at least one pole-cap (1) of the pressure vessel is designed in such a way that there are, after adding the fibre reinforcement layer (5), no components of the control means (2) which extend beyond the vessel surface besides elements (3, 3') generating a bias tension for the pressure reducer.

21. Pressure vessel according to claim 19, wherein the at least one pole cap (1) of the pressure vessel is split into an inner high-pressure part (8) which is surrounded by a first fibre reinforcement layer (11), and a low pressure part (13) comprising a pressure reducer diaphragm (12) and the gas outlet (7) mounted on said first layer and surrounded by a second fibre reinforcement layer (14) and, further, wherein the high pressure part (8) comprises a residual-pressure valve (15), a shut-off valve (17), the components of a pressure reducer up to the valve seat (9) and a through-flow limiting valve.

22. Pressure vessel according to claim 1, that is made as a metallic pressure vessel and wherein at least one end-cap (1) of the pressure vessel encloses the components of the control means (2) and is welded to the cylindrical main part (4) of the vessel and, further, wherein at least one end-cap (1) of the metal pressure vessel is shaped in such a way that there are not components of the control means (2) which project beyond the vessel surface, with the exception of elements (3, 3') which generate a bias tension for the pressure reducer.

* * * * *